3,153,960
CONTACT LENS CUTTING APPARATUS
Davies Aliport, Tulsa, Okla., assignor to The Plastic Contact Lens Company, Chicago, Ill., a corporation of Illinois
Filed Aug. 8, 1960, Ser. No. 48,128
3 Claims. (Cl. 82—1)

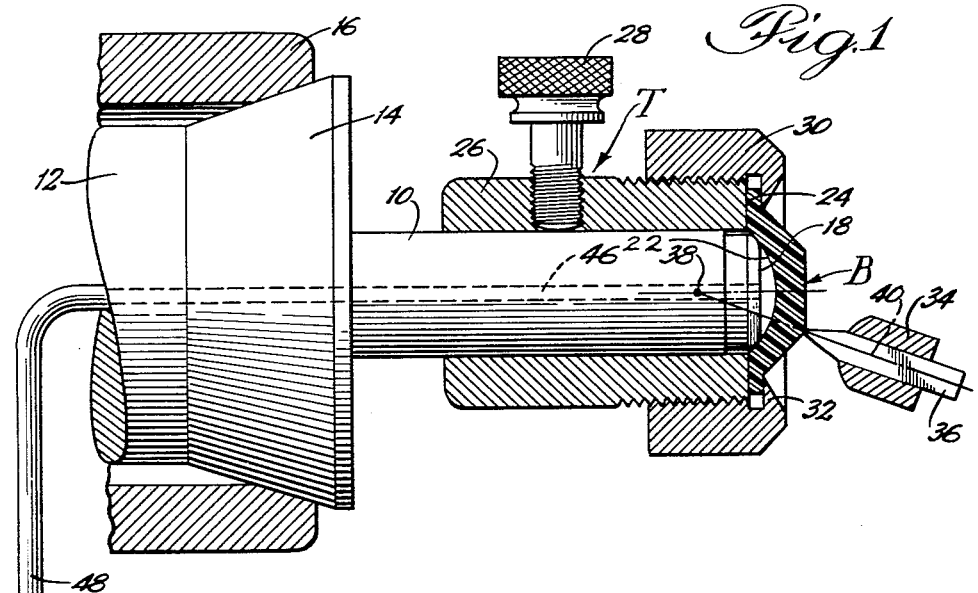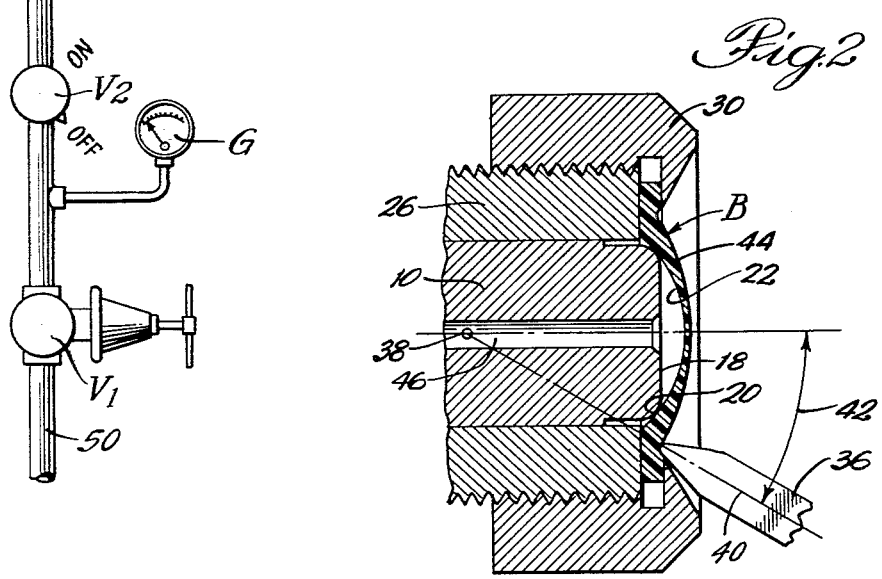

This invention relates to a contact lens cutting apparatus of comparatively simple and inexpensive construction.

One object of the invention is to provide apparatus in the form of a holder for a lens blank while the same is being cut, and a means to introduce fluid under pressure to the back of the lens to support it against distortion while the cut is being made.

In the cutting of contact lenses from plastic material such as methyl methacrylate they are often cut quite thin and the pressure of the cutting tool tends to distort them during the cutting operation. The lenses are cut from blanks with a base curve for the concave side of the lens and a power curve for the convex side of the lens. Either curve may be cut first, and then the other curve is cut in relation to the first curve. When the second curve is being cut support is needed because one part of the lens may be as thin as 0.1 mm., especially high powered negative lenses which are desirably very thin at the center to minimize the thickness at the edge of the lens.

I have found that a lens can be adequately supported by means of fluid pressure such as water, oil or air under pressure, and the primary object of my present invention is to provide an apparatus that includes such a means.

A further object of my invention is to provide means to regulate the pressure of such fluid so as to provide the desired support without causing undesirable distortion of the lens because of too much fluid pressure.

Accordingly, an additional object is to provide in conjunction with a lens holding tool, means to supply fluid pressure thereto and a further means for nicely regulating the degree of such pressure.

With these and other objects in view, my invention consists in the construction, arrangement and combination of the various parts of my contact lens cutting apparatus, whereby the objects contemplated are attained, as hereinafter more fully set forth, pointed out in my claims and illustrated in detail on the accompanying drawing, wherein:

FIG. 1 is a cross sectional view through one type of lens holding tool showing a lens blank therein and a cutting tool for cutting a spherical surface thereon, and also shows diagramatically my means for supplying fluid under pressure to the back of the lens for supporting it, together with means to regulate the degree of such pressure, and FIG. 2 is a further enlarged view of a portion of FIG. 1 showing the final cut being taken on the lens.

On the accompanying drawing, I have used the reference character T to indicate in general a lens blank holding tool. The tool T comprises a stem 10 extending from a shank 12 that has a cone shaped portion 14 seated in a lathe spindle 16. As best shown in FIG. 2 the stem 10 has a flat end 18 and an edge 20 rounded on a radius somewhat sharper than any possible base curve 22 of a contact lens being cut from a lens blank B. The edge 20 therefore provides a true circle of contact of the base curve 22 (which is spherical) with the stem 10 as illustrated and claimed in the copending application of Henry J. Kratt, Serial No. 24,473 filed April 25, 1960, now Patent No. 3,100,955. The circle of contact referred to also serves as a seal as will hereinafter appear.

The blank B is shown as having a flange 24 against which a sleeve 26 may be slid along the stem 10 while the blank B is manually held in contact with the edge 20 of the stem, whereupon the sleeve 26 may be fixed in position on the stem by tightening a set screw 28. Thereafter a sleeve 30 is threaded on the sleeve 26 and has a flange 32 to engage the flange 24 of the lens blank B so that the blank is properly oriented relative to the axis of rotation of the stem as fully shown in the co-pending application just referred to.

It is to be understood that the lens blank holding tool is merely an illustration of one type, whereas other suitable types may be used instead. The usual cutting tool 36 is shown in a holder 34 that is so mounted as to pivot about a center such as indicated at 28 to cut a power curve 44 on the lens blank B in the usual way. The centerline of the tool is indicated at 40.

When the power curve 44 is being cut (by oscillating the tool 36 as indicated by the arrow 42 in FIG. 2 and feeding the tool progressively toward the blank) there is a tendency for the pressure of the tool 36 to bend the blank due to the pressure of the tool thereon, but if a counter-pressure can be provided back of the lens then there would be no such distortion that results in a non-spherical cut of the power curve 44. Obviously if the end of the stem 10 were made to fit the base curve 22 the problem would be solved but since there are many hundreds of different base curves, this would require many hundreds of different stems to fit them. The stem 10 on the other hand having the rounded edge 20 can fit a multitude of base curves which of course presents the problem of the necessary pressure to back up the lens. I provide such pressure in a very simple manner by the apparatus which I will now describe.

The stem 10 is provided with a bore 46 to which a fluid pipe 48 extends from an "ON-OFF" valve $V^2$ and a pressure regulator valve $V^1$. A supply pipe 50 is provided for supplying water, oil, air or other fluid under pressure to the valve $V^2$ which of course may be regulated by the pressure regulator valve $V^1$, a pressure gauge G being provided to indicate the available pressure flowing to the valve $V^2$. When the valve $V^2$ is turned on after the lens blank is chucked, the fluid pressure is communitating through the pipe 48 and the bore 46 to the back of the lens blank B and supports it in accordance with the pressure as indicated on the gauge G. The pressure is held against escape by the circle of contact of the edge 20 of the stem 10 with the base curve 22 of the lens blank. Even though slight leakage occurs, the pressure regulator valve $V^1$ serves to admit fluid under the proper pressure to maintain that pressure as long as the valve $V^2$ is open. This pressure may be regulated to suit the particular cut (in this case the power curve 44) being made on the front of the lens as illustrated in FIG. 2.

From the foregoing specification it will be obvious that I have provided an apparatus which supports a contact lens being cut in opposition to the pressure of the cutting tool and a convenient means for nicely adjusting the pressure of the fluid against the lens in accordance with variations in tool pressure, thickness of lens, etc.

Some changes may be made in the construction and arrangement of the parts of my contact lens cutting apparatus without departing from the real spirit and purpose of my invention, and it is my intention to cover by my claims any modified forms of structure or use of mechanical equivalents which may reasonably be included within their scope:

I claim as my invention:

1. In an apparatus of the character disclosed, means for holding a contact lens blank having one surface thereof cut including a stem having an end face portion making ring contact directly with such surface while the other surface of the lens is being cut, means to supply fluid under pressure through said stem to impinge the back of said lens in opposition to the pressure of a cutting tool when cutting said other surface, such fluid being substantially sealed against escape by such ring contact, and means for regulating the pressure of the fluid flowing through said stem to said lens.

2. Apparatus of the character disclosed comprising a stem rotatably mounted and including an end face portion, means for holding a flanged contact lens blank having a concave surface thereof cut with said surface tightly engaged with said end face portion of said stem, means for supplying fluid directly against said concave surface, and means for regulating the pressure of the fluid flowing to said concave surface.

3. Apparatus of the character claimed in claim 2 wherein said first means comprises a sleeve slidable on said stem, means threaded on said sleeve for cooperating with the sleeve to confine the flange of the contact lens blank, and means for locking said sleeve to said stem in position with said concave surface of said lens blank engaging said end of said stem.

References Cited in the file of this patent
UNITED STATES PATENTS

| | | |
|---|---|---|
| 2,237,744 | Mullen | Apr. 8, 1941 |
| 2,441,108 | Turner | May 4, 1948 |
| 2,851,916 | Grandy et al. | Sept. 16, 1958 |